April 27, 1943.  J. A. J. BENNETT  2,317,340

HELICOPTER

Filed Aug. 23, 1940  7 Sheets-Sheet 1

INVENTOR
James Allan Jamieson Bennett
ATTORNEYS
Synnestvedt & Lechner

April 27, 1943. J. A. J. BENNETT 2,317,340
HELICOPTER
Filed Aug. 23, 1940 7 Sheets-Sheet 2

INVENTOR
James Allan Jamieson Bennett
ATTORNEYS
Lyonsvedt & Lechner

April 27, 1943.	J. A. J. BENNETT	2,317,340
HELICOPTER
Filed Aug. 23, 1940	7 Sheets-Sheet 4

Fig. 6.

INVENTOR
James Allan Jamieson Bennett
ATTORNEYS
Synnestvedt & Lechner

April 27, 1943.  J. A. J. BENNETT  2,317,340
HELICOPTER
Filed Aug. 23, 1940   7 Sheets-Sheet 5

April 27, 1943.  J. A. J. BENNETT  2,317,340
HELICOPTER
Filed Aug. 23, 1940   7 Sheets-Sheet 6

Fig. 10.

INVENTOR
James Allen Jamieson Bennett
ATTORNEYS
Symmestvedt & Lechner

April 27, 1943.   J. A. J. BENNETT   2,317,340
HELICOPTER
Filed Aug. 23, 1940   7 Sheets-Sheet 7

*Fig. 11.*

Patented Apr. 27, 1943

2,317,340

UNITED STATES PATENT OFFICE 2,317,340

HELICOPTER

James Allan Jamieson Bennett, Esher, England, assignor to Autogiro Company of America, Willow Grove, Pa., a corporation of Delaware Application August 23, 1940, Serial No. 353,810
In Great Britain February 18, 1939

34 Claims. (Cl. 244—17)

This invention relates to rotary wing aircraft and in particular to helicopters.

An object of the invention is to provide an improved arrangement for compensating the torque reaction of a helicopter with a single lifting rotor and for enabling all parts of the rotor blades to operate under an efficient aerodynamic regime at all forward speeds of the aircraft.

A further object of the invention is to provide a rotary wing aircraft intermediate in type, hereinafter referred to as a "gyrodyne," between a rotaplane (with the rotor free for autorotation and an upward total axial air flow through the rotor disc), on the one hand, and a pure helicopter (with the rotor driven and a downward total axial air flow through the rotor disc), on the other hand, that is with the mean axial flow through the rotor disc substantially zero at high forward speed as hereinafter more fully explained.

A further object of the invention is to provide a control system for such intermediate type aircraft.

Yet a further object is to provide a rotary wing aircraft capable of conversion for operating as one of such intermediate type or, as desired, as a rotaplane.

A still further object is to provide means for effecting such conversion from rotaplane operation to such intermediate type operation, and vice versa, whilst the aircraft is in flight.

In a helicopter according to the invention and having a single lifting rotor the axis of the airscrew thrust is offset laterally from the rotor axis to an extent sufficient to give a substantial balance between the torque reaction of the rotor and the moment of the airscrew thrust about the rotor axis. It is desirable that the drags of the rotor and other parts of the aircraft should produce yawing moments which substantially balance out under gliding conditions, i. e., with substantially zero airscrew thrust and rotor torque, and, for this purpose it may be desirable for the rotor axis to be offset laterally from the longitudinal axis of symmetry of the aircraft opposite from the lateral offset of the airscrew thrust.

For operation as a helicopter over a range of forward speeds it is desirable to maintain the axial component of air flow through the rotor disc as constant and as low as possible in absolute magnitude. This is accomplished according to a feature of the invention by coupling the rotor and propulsive airscrew means to the same power unit and so selecting the gear ratios of the respective transmissions, having regard to the torque coefficients of the rotor and propulsive airscrew means, that substantially equal power is delivered to each. In such case the rotor blades may have a substantially constant pitch angle setting throughout their lengths. Further, provision may be made for automatic regulation of the mean pitch angle of the blades to maintain substantial constancy of rotor revolutions, in which case an overriding manual control for blade pitch angle may be provided.

Control in yaw may be obtained by means of a rudder situated in the slipstream of the propulsive airscrew means, and balance in yaw (especially having regard to gliding conditions) by a fixed fin having an effective lateral offset from the longitudinal axis of symmetry of the aircraft substantially equal and opposite to that of the rudder.

Alternatively, or in addition, control in yaw may be effected particularly at low flying speeds or when hovering by variation of the pitch of the propulsive airscrew means.

A convertible aircraft for use either as a helicopter or as a rotaplane according to a feature of the invention will have additional propulsive airscrew means so located at the other side of the longitudinal centre line of the aircraft that the thrust axes of both propulsive airscrew means are symmetrical about said centre line and that the yawing moments produced by said two means balance out. A single power unit may serve to drive the rotor and one propulsive airscrew means for helicopter operation and both airscrew means for rotaplane operation. For convertibility during flight the power transmission system may include clutches whereby either said additional propulsive airscrew means or the rotor alone may be disconnected from the power unit.

During rotaplane operation, means for automatic regulation of the mean pitch angle of the rotor blades to maintain substantial constancy of rotor revolutions may remain operative, the overriding manual control for blade pitch angle being also preferably still employed.

Further, provision may be made for enabling the pilot to vary the pitch of the two propulsive airscrew means simultaneously and equally as required and simultaneously and differentially for yaw control at low speeds and when hovering.

The present invention makes use of the conception of a "gyrodyne," that is a rotary wing aircraft intermediate in type between a rotaplane and a pure helicopter in that in normal flight, at least when operating at or near normal cruising speed and possibly also over an extended range of speeds above and below the cruising speed, the mean axial flow through the rotor disc is substantially zero, i. e., the angle of incidence of the rotor disc to the undisturbed relative airstream (in front of the rotor) is positive and less than the downwash angle in rear of the rotor. This may be expressed in another way by saying that the axial induced velocity is substantially equal and opposite to the axial component of the undisturbed airstream relative to the rotor. It can be shown that the torque input of a rotor operating under such a regime is at least approximately equal to the torque required to overcome the profile drag of the rotor blades alone. It can also be shown that the thrust vector of the rotor is directed backwards with respect to the direction of flight and therefore a forward propulsive thrust must be provided sufficient to overcome this backward component of the rotor thrust in addition to balancing the sum of the downwind force of the rotor in the plane of the rotor disc, the parasite drag of the whole aircraft and the backward component (if any) of the aircraft weight relative to the line of flight, as occurs when climbing.

A rotor operating under the above described "intermediate" or gyrodyne regime, possesses several advantages. The mean local angle of incidence of the blade elements is substantially constant over the blade radius and the blades can be made with constant pitch angle without loss of aerodynamic efficiency. A suitable selection of pitch angle will therefore give optimum angle of incidence of blade elements at forward speeds for which the "intermediate state" can be maintained. A further advantage is that the blade pitch angle is either within or only just beyond the maximum limit of the autorotative range, so that little or no adjustment of pitch angle is required when passing from power-driven flight to motorless glide or descent. The torque input of the rotor is lower than if the rotor were operating in the pure helicopter regime and therefore the problem of compensating torque reaction on the aircraft is simplified.

If the rotor of a rotary-wing aircraft is to operate as a gyrodyne it is necessary for power to be applied to the rotor and also for forward propulsion; the attainment of the gyrodyne or intermediate state is influenced by a number of factors and depends on the assignment of appropriate numerical values thereto, viz:

(a) Power loading of the aircraft (wt. per H. P.), (b) Disc loading (wt. per sq. ft.) and "solidity" ($\sigma$) of the rotor, (c) Pitch angle ($\theta$) of the rotor blades, (d) Rotor blade aerofoil characteristics (especially profile drag coefficient), (e) Propulsive airscrew characteristics (torque coefficient and thrust coefficient), (f) Parasite drag, (g) Power distribution between rotor and airscrew.

I have found that, if the power loading is of the "medium performance" order, e. g., ten to fifteen pounds per H. P., if the disc loading has a value giving a reasonable sinking speed in motorless descent at steep angles of glide, e. g., 45°, i. e. not more than 20 ft./s. and if the "solidity," rotor blade profile drag, propulsive airscrew characteristics and parasite drag coefficient have values within the normal ranges of good current rotaplane practice, operation in the "gyrodyne state" over a portion of the forward speed range at and about the normal cruising speed and power can be attained if the power is about equally distributed between rotor and propulsive airscrew, and if the pitch angle of the rotor blades is about or slightly in excess of the upper limit for stable autorotation. In a practical aircraft designed to operate under these conditions, it is contemplated that the rotor blade pitch angle would be controllable and variation of the propulsive airscrew pitch may also be desirable.

It must be understood that it is not suggested that the improved rotary wing aircraft can or should be capable of operating only as a gyrodyne. Normally, such an aircraft will so operate at about normal cruising speed, but at slower forward speeds and when hovering or ascending vertically it will operate as helicopter with downward axial flow and it may be desirable to provide for operation as a true helicopter at higher forward speeds; especially some advantage in overall efficiency at cruising and maximum forward speed may be obtained if the rotor operates in a (helicopter) regime closely analogous to the "gyrodyne state" but having a slight downward axial flow through the disc, sufficient to cause the rotor to be just "self-propelling," i. e., so that the thrust vector has a small forward component just sufficient to overcome the downwind force of the rotor in the plane of the rotor disc, the parasite drag of the aircraft being balanced by the propulsive airscrew thrust. In motorless descent the aircraft will, of course, operate as a rotaplane. Furthermore, the regime or state of operation of the rotor will, in general, be affected by the throttle setting.

In any case, however, the pitch setting of the rotor blades for optimum efficiency will vary with forward speed and to meet this condition and also to prevent any tendency to overspeeding the engine when a fixed transmission ratio between engine and rotor is employed it is advantageous to regulate the mean pitch angle of the rotor blades automatically to maintain substantial constancy of rotor revolutions, e. g., by a "constant-speed" governor; preferably, also an overriding manual control for the rotor blade pitch angle may be provided.

It may in certain circumstances be desirable that an improved rotary wing aircraft having the characteristics discussed above should be capable of operating as a pure rotaplane or readily convertible for such operation. This may be accomplished by providing two propulsive airscrews symmetrically placed with respect to the longitudinal centre line of the aircraft and transmission means connecting the single power plant to both said airscrews and to the rotor, including clutches by which one of the airscrews and the rotor can be alternately connected to the power plant, the connection of the second airscrew to the power plant being permanent. To obtain balance of torque reaction when the rotor is driven the propulsive airscrew on the same side of the aircraft as the advancing blades of the rotor will be the one which is permanently connected to the engine, and the transmission of the other airscrew and of the rotor will contain clutches whose controls are so interconnected that when the rotor clutch is engaged the airscrew clutch is disengaged and conversely. The clutch control may be operable in flight in order to enable the aircraft to be converted from a gyroplane into a true rotaplane and vice versa in the air. Alternatively, if it should only be required to effect such conversion on the ground the clutch control may be made inaccessible in flight, or the clutches may be dispensed with and replaced by easily disconnectible couplings, in which case it may also be convenient to remove the airscrew which is not permanently driven when the aircraft is required to operate with power driven rotor. The two propulsive airscrews will normally be of equal pitch and diameter in order to preserve symmetry when the aircraft is operating as a rotaplane and are preferably of opposite hand, and their torque characteristics will be such that at normal revolutions of the power plant its full power is absorbed by the two airscrews, the rotor being disconnected.

A gyroplane aircraft and a convertible helicopter-rotaplane aircraft, certain control means therefor and means for effecting conversion of the latter aircraft while in flight, according to the invention are illustrated by the accompanying drawings.

Referring first to Figs. 1 to 6 of the drawings, the gyroplane aircraft there shown has a single fuselage 11 mounting a pylon or supporting structure 12 of the usual kind and a single rotor indicated generally at 13 supported by said pylon. The rotor blades 14 are fully articulated, that is their connections comprise flapping and lead-lag pivots (the axes of either or both of which may be obliquely inclined in the known manner) and means are provided for varying the pitch angle of the blades, as described hereinafter.

Flying control of the aircraft is effected by tilting the path swept by the tips of the blades 14 by tilting a rotor head of known type or preferably by control in a known manner of the periodic or cyclic variation of the rotor blade pitch angle in the longitudinal and transverse azimuths.

Extending laterally from both sides of the fuselage 11 are two short stub wings or streamlined fairings 16 and 17 to the outer parts of which the legs 18 of the undercarriage are secured. The undercarriage shown is of the tricycle type having a forward leg 19. All three legs 18, 18 and 19 may be arranged in a known manner for retraction in which case the stub wings 16 and 17 may be utilized as housings for the legs 18 and wheels 20 thereof, the forward leg 19 and a wheel 21 thereof being received in the forward under part of the fuselage 11. The stub wing 16 carries a cooling radiator and cowling therefor indicated generally at R.

The aircraft has a single propulsive airscrew 22 carried by the stub wing 16. At the rear the fuselage 11 has extending therefrom tail planes 23 and 24, the tail plane 23 carrying a vertical rudder 25 located in the slipstream of the airscrew 22 and the tail plane 24 carrying a vertical fin 26, the effective lateral offset of which from the longitudinal axis of symmetry of the aircraft is substantially equal and opposite to that of the rudder 25. The rudder 25 is of service for control in yaw and the fin 26 for maintaining balance in yaw especially under gliding conditions. Further, in order that the drags of the rotor 13 and other parts may produce yawing moments which substantially balance out under gliding conditions, the rotor axis is offset laterally (see Figs. 2 and 3) from the longitudinal axis of symmetry of the aircraft at that side thereof remote from the airscrew 22.

A single power unit 27 is located within the fuselage 11 (see Fig. 4) at or near the centre of gravity of the aircraft and is connected through transmission means including gearing indicated generally at 28 with a substantially vertical rotor drive shaft 29 and with a transverse shaft 30 through which a drive is transmitted to the airscrew 22.

Figure 1:
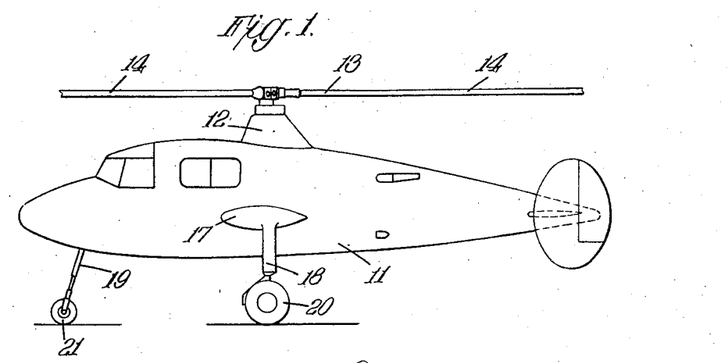
Figs. 1, 2 and 3 show the gyroplane aircraft in side elevation, front elevation and in plan, respectively.
Figure 2:
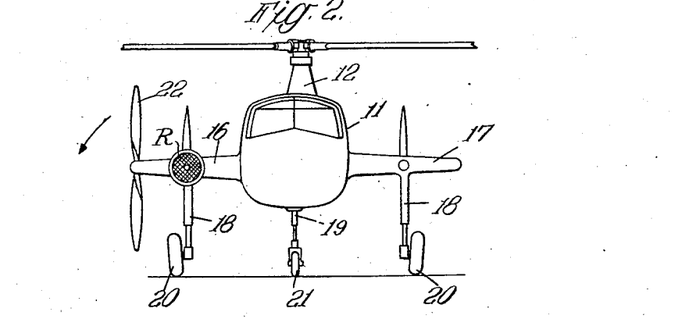
Figure 3:
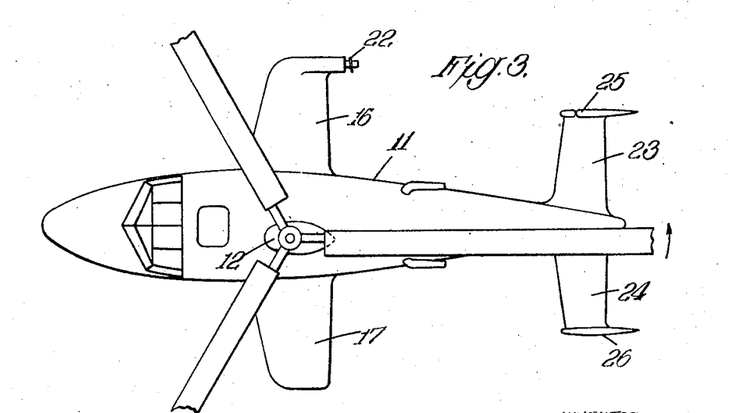

As indicated by an arrow, Fig. 3, the direction of rotation of the rotor 13 is such that the blades 14 thereof advance at that side of the fuselage 11 at which the airscrew 22 is located. In order that the rotor torque reaction may be substantially balanced by the airscrew thrust the airscrew 22 is designed to absorb one half the power of the power unit 27 at full throttle and normal revolutions.

The airscrew 22 is of known controllable pitch type and means are provided for automatically controlling the pitch of the blades thereof in conjunction with the rotor blade pitch, which it will be remembered is also variable.

Figure 5:
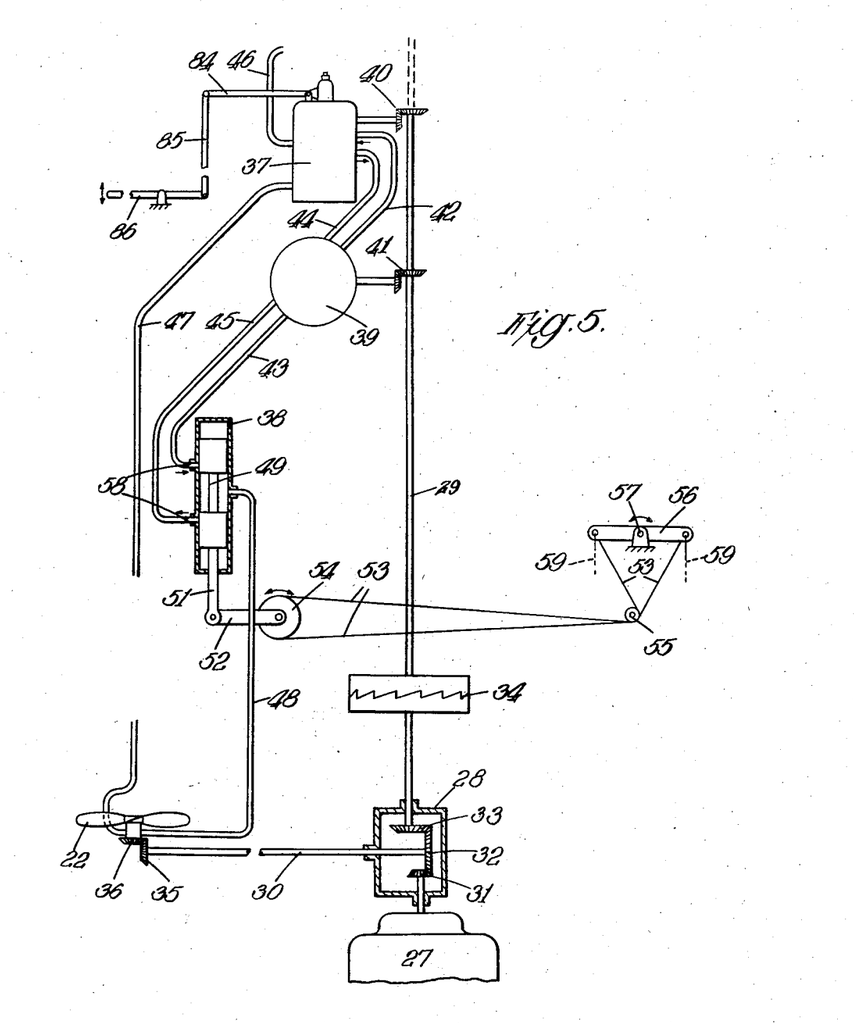
Fig. 5 is a diagrammatic representation of the power transmission system and certain control means of this aircraft.

Turning now to Fig. 5, the transmission gearing includes bevel wheels 31 and 32 connecting the power unit 27 to drive the cross-shaft 30 and a further bevel wheel 33, meshing with the wheel 32, connecting the power unit 27 to drive the rotor drive shaft 29 through a one-way drive device 34 permitting the rotor drive shaft 29 to overrun. The cross-shaft 30 is connected to drive the airscrew 22 by further bevel wheels 35 and 36. The pitch regulating means for the rotor 13 and for the airscrew 22 are of known hydraulic type, and are operated by a governor device 37 (shown fully in Fig. 6) and a pilot's control device 38, both of which are supplied with fluid under pressure by a pump 39. Both the governor device 37 and the pump 39 are driven from the rotor drive shaft 29 by bevel gears 40 and 41, respectively. Pressure pipes 42 and 43 and release or return pipes 44 and 45 connect the governor 37 and the pilot's control device 38, respectively, with the pump 39. The governor 37 is connected via a pipe 46 with the hydraulic blade pitch changing means and serves automatically to increase the mean blade pitch angle with increase in rotor speed, and vice versa. The governor 37 is also connected via a pipe 47 with the pitch changing means of the airscrew 22 so that the pitch of the latter is varied with that of the rotor blades to maintain the balance between the rotor torque reaction and the airscrew thrust.

The pilot's control 38, however, also is connected via a pipe 48 to the pitch changing means of the airscrew 22 so that the pilot may, for yaw control or steering, especially at low forward speeds or when hovering, override the regulation of the airscrew pitch by the governor 37. The pilot's control comprises a double plunger obturating element 49 which in the position shown cuts off both pump pipes 43 and 45 from the airscrew pipe 48. This element 49 is connected, via a plunger rod 51, crank arm 52, and cables 53 passing around a pulley 54 keyed to said arm 52 and guide pulleys indicated at 55, with the rudder bar 56 which in the usual way is mounted for rocking movement about a central fulcrum 57. Thus movement of the rudder bar 56 in the one direction will lower the obturating element 49 and connect the pressure pipe 43 with the airscrew pipe 48 and so cause the hydraulic pressure to increase the pitch of the airscrew 22 against spring pressure, whilst movement of the rudder bar 56 in the other direction will raise the obturating element 49 and connect the airscrew pipe 48 with the return pipe 45 and allow the airscrew pitch to decrease. The pressure and return pipes 43 and 45 have constrictions 58 whereby unduly sudden or sharp changes in pressure of the fluid in the pipe 48 are avoided.

Cables whereby the rudder bar 56 is connected to operate the rudder 25 are indicated at 59.

Figure 6:
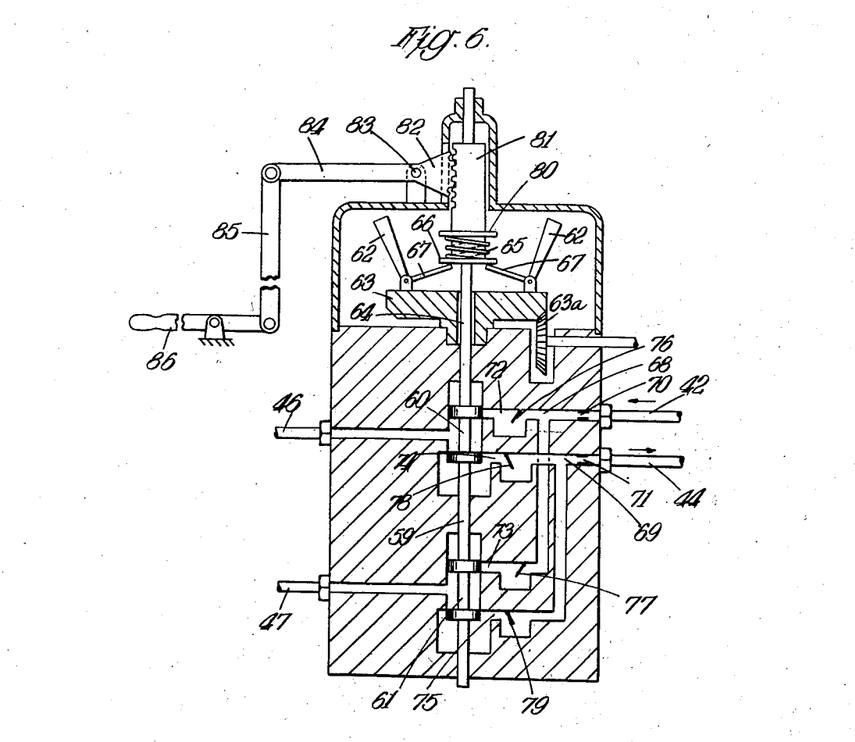
Fig. 6 is a diagrammatic sectional representation of a part shown in Fig. 5; whilst
Figure 7:
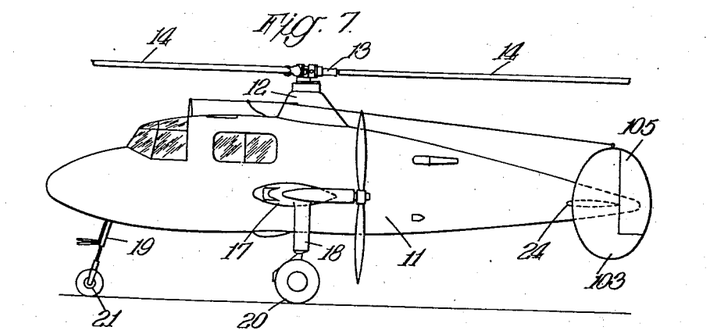
Figs. 7, 8 and 9 are views similar to Figs. 1, 2 and 3 showing the convertible aircraft in side elevation, front elevation and in plan, respectively.
Figure 8:
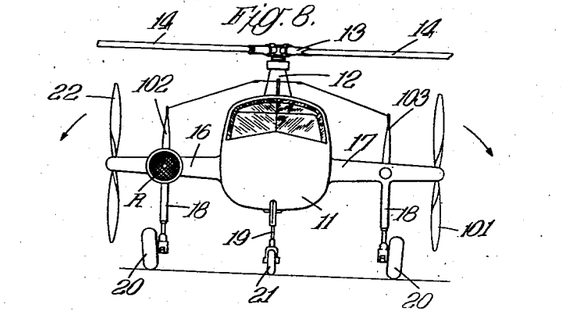

The governor device 37, see Fig. 6, includes a multiple plunger constituting two simultaneously operating double plunger obturating elements 60 and 61, analogous to that (49) of the pilot's control 38, serving to control the flow of pressure fluid to and from the rotor pipe 46 and airscrew pipe 47, respectively. The governor means proper are of centrifugal type and comprise two flyweights 62 mounted on a rotary member 63 driven from the rotor drive shaft 29 via bevel gearing 63a. Axial obturating movement is imparted to the two elements 60 and 61 via a thrust rod 64, pressed downwardly by a spring 65 bearing on a head 66 thereof, and the flyweights 62 have inwardly extending integral arms 67 which bear against the underside of said head 66 to tend to raise the thrust rod 64 upwardly against the spring 65. It will be seen that when the rotor speed increases the increased upward pressure of the flyweight arms 67 will overcome the spring 65 and the obturating members 60 and 61 will be raised and thus the rotor pipe 46 and the airscrew pipe 47 will be connected with the pressure pipe 42 from the pump 39. The hydraulic pressure so transmitted will actuate the rotor pitch changing means and the airscrew pitch changing means to increase the pitch of both until the necessary reduction in rotor speed has been effected, when the obturating elements 60 and 61 will return to their normal or cut-off positions shown in Fig. 6. Should the rotor speed decrease the spring 65 will overcome the reduced upward pressure of the flyweight arms 67 and will shift the obturating members 60 and 61 downwardly to connect the rotor and airscrew pipes 46 and 47 with the release or return pipe 44 allowing the rotor pitch, and with it the airscrew pitch, to decrease until the necessary increase in rotor speed has been effected. The pressure and return passages 68 and 69 in the body of the governor device and with which the pressure and return pipes 42 and 44, respectively, are connected, are provided (like the pipes 43 and 45) with constrictions 70, 71 to prevent unduly sudden or sharp changes of hydraulic pressure in the rotor and airscrew pipes 46 and 47.

Further, in order to prevent any transference of hydraulic pressure between the pipes 46 and 47 when the obturating elements 60 and 61 are raised or lowered, which would involve uncontrolled change of rotor pitch relative to airscrew pitch, pressure passages 72, 73 and return passages 74, 75 are provided with non-return valves 76, 77 and 78, 79 respectively.

The spring 65 bears upwardly against an abutment 80 at the lower end of a rack member 81 with which engages a quadrant 82 movable about a pivot 83 by means of an arm 84 connected via a link 85 with a control lever 86 which may be operated by the pilot to determine or set the rotor speed which the governor device 37 is to maintain. This control enables the pilot to adjust the rotor blade and the airscrew pitch simultaneously when he so desires and virtually overrides the automatic control by the governor 37.

It will be seen that in the non-convertible modified helicopter illustrated in Figs. 1 to 6, there is:

(a) Simultaneous automatic regulation of the rotor blade pitch and airscrew pitch;

(b) A pilot's overriding control of this; and (c) A pilot's steering and yaw control adjusting the airscrew pitch (independently of the rotor blade pitch) and the rudder.

In addition there is a control for a brake for holding the rotor stationary and a flying control for tilting the path swept by the tips of the rotor blades by controlling the periodic or cyclic variation of the rotor blade pitch angle. These latter controls will be described hereinafter.

The convertible helicopter-rotaplane aircraft shown in Figs. 7 to 10 is essentially similar to the non-convertible modified helicopter of Figs. 1 to 6, and corresponding parts thereof are indicated by the same reference numerals. In the case of the convertible aircraft, however, the axis of the rotor is not offset from the longitudinal axis of symmetry of the aircraft, and the stub wing 17, as well as the stub wing 16, has an airscrew indicated at 101. Further, each of the tail planes 23 and 24 has a vertical fin 102, 103 respectively and rudder 104, 105 respectively. Each fin 102 and 103 and the corresponding rudder 104, 105 is located in the slipstream of the corresponding airscrew 22 and 101 respectively.

As the aircraft as a whole is substantially symmetrical about the longitudinal axis of symmetry of the fuselage 11 no special provision such as offsetting the rotor axis is made to ensure yawing moments which balance out under gliding conditions.

Figure 9:
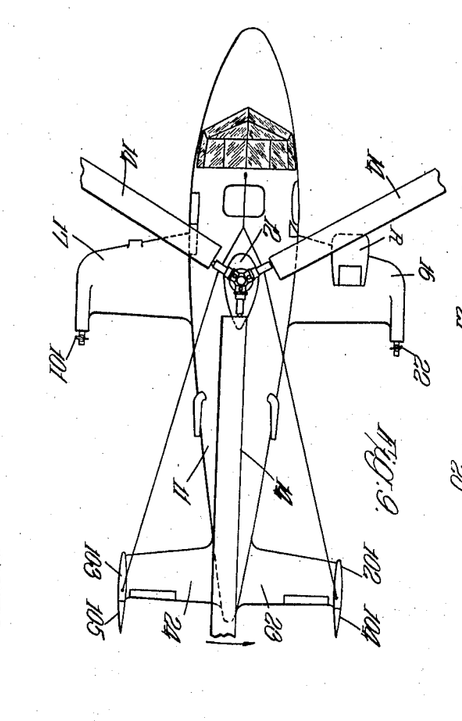

The airscrew 22 is permanently connected to be driven by the power unit 27 and is located at that side of the fuselage 11 at which the rotor blades 14 advance as indicated by the arrow Fig. 9. The airscrews 22 and 101 are of the same pitch and diameter but are of opposite hand and each is designed to absorb one half the power of the engine unit 27 at full throttle and normal revolutions. Both airscrews 22 and 101 are of known controllable pitch type.

Figure 4:
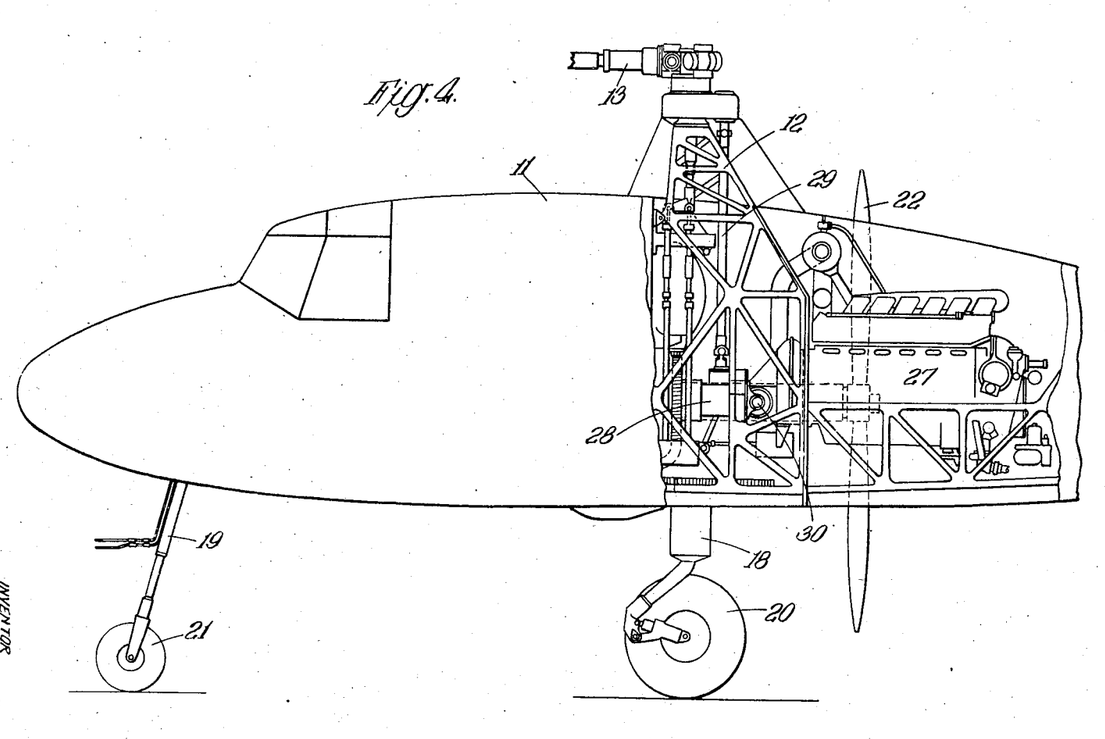
Fig. 4 is a part sectional side view of the machine drawn to an enlarged scale.

The layout of the power unit 27 and the associated transmission means is as shown in Fig. 4 except that the transverse shaft 30 extends from both sides of the gearing 28 to drive both airscrews 22 and 101. But for conversion, (see Fig. 10) the rotor drive shaft is connected to be driven from the gearing 28 by a clutch 106 and the extended shaft 30 is connected by a clutch 107 to drive the airscrew 101 through bevel gear wheels 108 and 109. These clutches 106 and 107 are connected by levers 110 and 111 respectively, with a control rod 112 coupled by a link 113 with a control lever 114 accessible to the pilot in such manner that when one clutch is engaged the other is disengaged. Thus it is ensured that either the rotor 13 or the airscrew 101, but not both at the same time, is driven. Also operated by the control rod 112 is a valve 115 for shutting off, for rotaplane operation, the governor device 37 from the pitch changing means of the airscrew 22.

Figure 10:
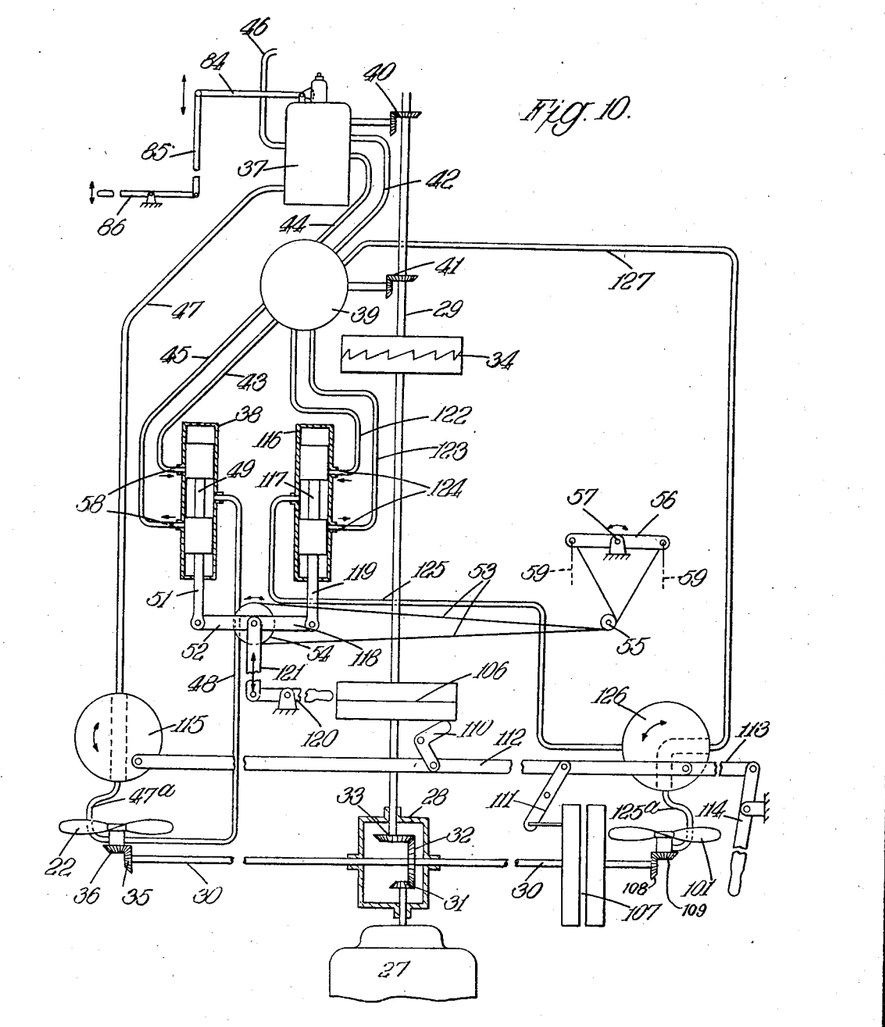
Fig. 10 is a diagrammatic representation, similar to Fig. 5 of the power transmission system, certain control means and the means for effecting conversion during flight.

The control means of the convertible aircraft include those of the non-convertible machine and like parts are indicated by like reference numerals in Figs. 5 and 10.

For modified helicopter operation the setting of the controls is as shown in Fig. 10, the clutch 106 being in and the clutch 107 out whilst the valve 115 connects the governor 37 to the airscrew 22 via the pipes 47 and 47a and the operation is as described above in connection with the non-convertible aircraft of Figs. 1 to 6.

For operation as a rotaplane an additional pilot's control device 116 is provided which is similar to the device 38, having a double plunger obturating element 117. This additional control device serves for controlling the pitch of the additional airscrew 101 and for operating it the pulley 54 is keyed to an additional arm 118 to which the obturating element 117 of the control device 116 is connected by a thrust rod 119. It will be seen that movement of the rudder bar 57, in addition to actuating the rudders 104 and 105 with which it is connected by the cables 59, will actuate the control devices 38 and 116 equally and oppositely so that the pitch of the airscrews 22 and 101 will be changed equally and oppositely, that is to say differentially, for steering or yaw control. The pulley 54 in this aircraft is movable together with the arms 52 and 118 by a control lever 120, with which it is connected by a link 121, whereby the pilot may actuate both control devices 38 and 116 equally and in the same direction so that the pitch of both airscrews 22 and 101 will be changed similarly and to equal extents. The control device 116 is connected with the pump 39 by pressure and release or return pipes 122 and 123 having constrictions 124 and with the pitch changing means of the airscrew 101 by a pipe 125, a valve 126 operated by the control 114 and a pipe 125a.

A further pressure pipe 127 from the pump 39 is shut off by the valve 126 when the control 114 is in the position for rotaplane operation. For modified helicopter operation this valve 126 connects the pump 39 via the pipes 127 and 125a with the pitch changing means of the airscrew 101 which are so designed as, under such continuous pressure, to shift the blades to feathered positions. It will be noted that movement of the obturating member 117 as a result of actuation of the rudder bar 56 during modified helicopter operation will be ineffective because the pipe 125 is then shut off by the valve 126.

It will be seen that in addition to controls equivalent to or the same as those of the non-convertible aircraft, the convertible machine of Figs. 7 to 10 has provision for driving the additional airscrew and:

(a) regulation of the rotor blade pitch alone, (b) a pilot's overriding control for this, (c) a pilot's steering and yaw control adjusting the pitch of the two airscrews differentially and the two rudders, (d) a pilot's control for adjusting the pitch of the two airscrews equally and in the same direction.

By the conversion control for modified helicopter operation:

(a) the rotor drive clutch is engaged, (b) the clutch for driving the additional airscrew is disengaged, (c) the governor device 37 is connected to regulate automatically the pitch of the permanently driven airscrew as well as the rotor blade pitch, (d) the pilot's control for varying the pitch of the additional airscrew is rendered inoperative, and (e) the additional airscrew is feathered.

By the conversion control, for rotaplane operation:

(a) the rotor drive clutch is disengaged, (b) the clutch driving the additional airscrew is engaged, (c) the governor device is cut off from the pitch changing means of the additional airscrew to regulate the rotor blade pitch alone, and (d) the pilot's control for varying the pitch of the additional airscrew is rendered operative.

In addition, as in the non-convertible aircraft, there is a brake for holding the rotor stationary and a flying control which operates by controlling the periodic or cyclic variation of the rotor blade pitch angle.

Figure 11:
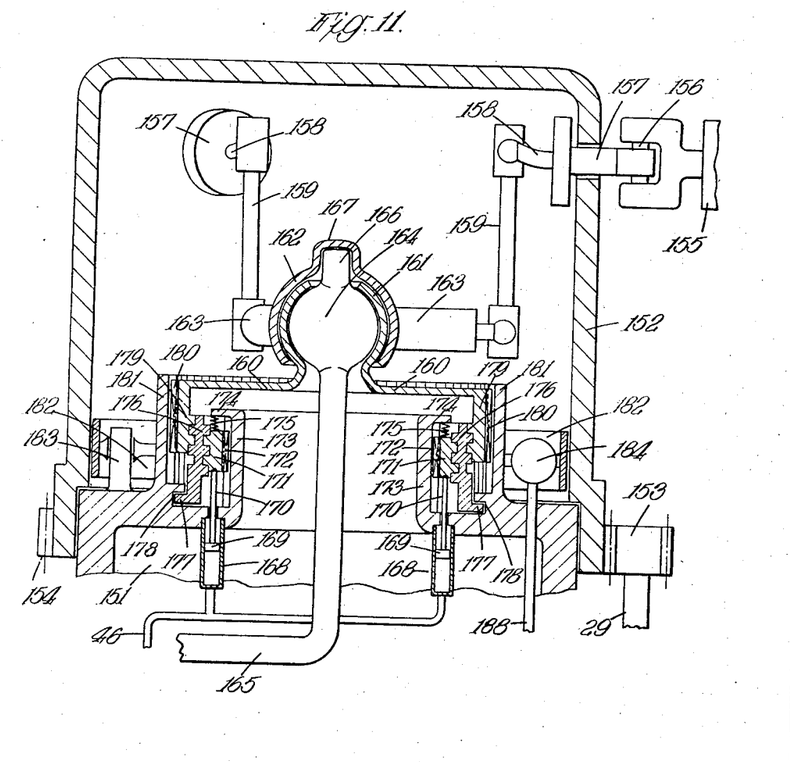
Fig. 11 is a diagrammatic sectional view of a rotor head having means for varying the mean pitch angle of the blades, flying control means for controlling the periodic or cyclic pitch angle variation of said blades, and a brake for holding the rotor stationary.

Turning now to Fig. 11 of the drawings, this shows diagrammatically a rotor head having means for varying the mean pitch angle of the blades, flying control means for controlling the periodic or cyclic pitch angle variation of the blades, and a brake for holding the rotor stationary. Such a rotor head is thus applicable to either the non-convertible aircraft of Figs. 1 to 6 or the convertible aircraft of Figs. 7 to 10.

As shown in Fig. 11 a rigid structure 151 carried by the pylon or other supporting structure 12 (Figs. 1 to 4 and 7 to 9) itself has rotatable thereon, coaxially thereof, the rotor head proper which as indicated at 152 is generally of cylindrical form, and for driving the rotor head, the rotor drive shaft 29 has fast thereon a pinion 153 which meshes with spur teeth 154 on the rotor head 152. Part of one of the blades is indicated at 155 and, as shown, this is connected via a lead-lag pivot 156 with a radial member 157 journalled in the wall of the rotor head 152 for rotation about its longitudinal axis to change the pitch angle setting of the blade 155. Each of the radial members 157 has extending therefrom within the rotor head 152 a crank arm 158 from the end of which there depends downwardly a rigid link 159.

For imparting movement to these crank arms 158 via the rigid link 159 a member 160 is slidable up and down within the rotor hub 152 coaxially thereof. This member 160 carries centrally thereof at its upper side a hollow spherical part 161 over which there fits the hollow spherical hub indicated at 162 of a three arm spider, two of the arms of which are indicated at 163 and each of these arms is connected at its outer end with a corresponding link 159. It will be seen that by bodily raising and lowering the member 160 the spider 162, 163 will be moved similarly and the pitch angles of all three blades will be adjusted equally.

On the other hand if the spider 162, 163 be rocked upon the spherical part 161 of the member 160 about any transverse axis, then corresponding change in the periodic or cyclic variation of the pitch angles of the blades will be effected as is suitable for flying control. For this latter purpose there is fitted within the hollow spherical part 161 of the member 160 a spherical portion 164 of a flying control rod 165 an extension 166 of which engages in a recessed portion 167 of the hub 162 of the three armed spider. The control rod 165 is thus rockable about the common centre of the spherical part 164, the spherical part 161 and the spherical hub 162, and such rocking movement thereof will impart similar rocking movement to the spider 162, 163.

It will be remembered (see Figs. 5 and 10) the variation of the mean rotor blade pitch angles is effected automatically or by the pilot's overriding control by hydraulic means for which purpose a pipe 46 connects the governor device 37 with the rotor head. This pipe 46 is branched at the rotor head and serves to convey pressure fluid to a series of hydraulic cylinders carried by the structure 151, and of which two only are indicated in Fig. 11 at 168. Pistons 169 in these cylinders 168 are connected by push rods 170 with an annular member 171 which is in splined relationship, as indicated at 172, with an inner annular part 173 of the structure 151 so that it cannot rotate and is pressed downwardly against the push rods 170 and the hydraulic pressure by a series of springs 175 interposed between it and an outwardly directed flange 174 of the annular part 173, two only of such springs being indicated in Fig. 11.

In addition to being in splined relationship at 172 with the part 173, the annular member 171 is in screw threaded relationship at its outer face with a rotatable annular member 176 which is held against axial movement by the engagement of an integral flange 177 thereof in an annular groove 178 formed for the purpose, in the structure 151. This rotatable annular member 176 is in turn in screw threaded engagement with a downwardly extending cylindrical part 179 of the member 160, which downwardly extending part 179 in turn is in splined engagement as indicated at 180 with a second annular part 181 of the structure 151 and so prevented from rotating. It will be apparent therefore, that up and down movement of the annular member 171 will result in rotation of the rotary annular member 176 and, as this latter is held against up and down movement, the effect is to move member 160 upwardly or downwardly, and consequently effect equal change in the mean pitch angle of the rotor blades 155.

One of a pair of brake shoes for cooperating with the inner surface of the rotor head 152 to hold the rotor stationary is indicated at 182, an abutment pivot for said shoes at 183 and a hydraulic cylinder for actuating the brake at 184. A pipe 185 for pressure liquid leads from the cylinder 184 to a pressure creating device (not shown) of convenient type.

What I claim is:

1. In an aircraft, a power-driven variable-pitch sustaining rotor, a power-driven variable-pitch airscrew mounted to rotate on a generally horizontal axis which is offset from the rotor axis so as to set up a counter torque, and a unified control for normally effecting conjoint change of airscrew pitch and rotor pitch comprising a movable member coupled to affect by its movement one of said pitches and also coupled to affect the other of said pitches by the same movement.

2. In an aircraft, a power-driven variable-pitch sustaining rotor, a power-driven variable-pitch airscrew mounted to rotate on a generally horizontal axis which is offset from the rotor axis, a unified control system operative conjointly upon mean airscrew pitch and mean rotor pitch including a movable member coupled to affect both of said pitches in the same sense by movement of said member in one direction and further including means for altering the relative mean pitch whereby to effect yawing control, and a rotor control operative at will to shift the rotor lift line laterally and longitudinally irrespective of the mean rotor pitch whereby to effect lateral and longitudinal attitude control, said unified control system and said rotor control being operable together to control the craft in hovering or vertical flight.

3. In an aircraft having power means, a power-driven variable-pitch sustaining rotor, a power-driven variable-pitch airscrew mounted to rotate on a generally horizontal axis which is offset from the rotor axis, so as to set up a counter torque, transmission means normally maintaining a pre-determined ratio between rotor and airscrew R. P. M., and a unified control for normally effecting conjoint change of airscrew pitch and rotor pitch comprising a movable member coupled to affect by its movement one of said pitches and also coupled to affect the other of said pitches by the same movement.

4. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, so as to set up a counter torque and pitch-regulating means for positively coordinating the variable pitch settings of said airscrew and rotor blades comprising a movable member and operating connections whereby pitch variations of both the airscrew and the rotor blades can be caused to take place in the same sense by one and the same movement of said member.

5. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, and control means comprising a manually movable member having operating connections coupled to affect conjointly the variable pitch of said airscrew and rotor blades by a single movement in one plane.

6. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, and means comprising an automatic governor positively coordinating the variable pitch setting of said airscrew and rotor blades, whereby to secure an approximate balance between the moment of the airscrew thrust about the rotor axis and the torque reaction of the rotor.

7. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, means comprising an automatic governor positively coordinating the variable pitch setting of said airscrew and rotor blades, whereby to secure an approximate balance between the moment of the airscrew thrust about the rotor axis and the torque reaction of the rotor, and a manual control adapted to override the effect of the governor.

8. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, means positively coordinating the variable pitch settings of said airscrew and rotor blades, whereby the pitch variation of both takes place in the same sense, and means operative to alter the relative setting of airscrew pitch and rotor blade pitch for a given position of said coordinating means.

9. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, means including a hand-controlled device for positively coordinating the variable pitch settings of said airscrew and rotor blades, whereby the pitch variation of both takes place in the same sense, and foot-controlled means operative to alter the relative setting of airscrew pitch and rotor blade pitch for a given position of said coordinating means.

10. In an aircraft having power means, a power-driven sustaining rotor comprising an axis member and variable-pitch blades pivoted thereon, a power-driven variable-pitch airscrew mounted to rotate on a generally horizontal axis which is offset from the rotor axis, and a pitch adjusting system comprising means positively coordinating the variable pitch settings of said airscrew and rotor blades, whereby the pitch variation of both takes place in the same sense, and also comprising means operative to alter the relative setting of airscrew pitch and rotor blade pitch for a given position of said coordinating means, and a controllable rudder operative by an element of said pitch adjusting system.

11. In a rotary wing aircraft the combination of a single power plant, a sustaining rotor and an airscrew arranged with its axis offset from the axis of the sustaining rotor, the sustaining rotor and airscrew both being driven by the said power plant, the mean pitch angle of the rotor blades being controlled by a "constant-speed" governor and the pitch of the airscrew being controlled by means interconnected with the rotor blade pitch controlling means in such a manner as to maintain at least approximate balance between the moment of the airscrew thrust about the rotor axis and the torque reaction of the rotor.

12. An aircraft having only one sustaining rotor, airscrew means having a mean thrust located on one side of the plane of symmetry of the aircraft, to wit, at that side on which the rotor blades advance into the relative flight wind during translational flight, engine means for driving said rotor and said airscrew means, and a controllable rudder offset from the longitudinal plane of symmetry of the aircraft toward the same side as the mean thrust of the airscrew means, the rudder being subjected to airscrew slipstream.

13. An aircraft in accordance with claim 12, and further incorporating means providing stability in yaw comprising a normally fixed substantially vertical surface offset to that side of the longitudinal plane of symmetry on which the rotor blades retreat in translational flight.

14. An aircraft in accordance with claim 12, in which the airscrew means is variable as to pitch angle and further incorporating mechanism for controlling the aircraft in yaw comprising means for varying the pitch angle of the airscrew means and thereby varying the thrust thereof with relation to the rotor driving torque.

15. An aircraft having only one sustaining rotor and only one propulsive airscrew, the airscrew being laterally offset from the longitudinal plane of symmetry of the aircraft toward that side on which the rotor blades advance into the flight wind during translational flight, and engine means for driving the rotor and the airscrew, the center of the rotor being offset from the longitudinal plane of symmetry of the aircraft toward that side thereof opposite to the offset of the airscrew.

16. An aircraft having only one sustaining rotor arranged above the body of the craft, engine means for driving the rotor, disconnectible power transmission means between the engine and the rotor providing for operation of the rotor with and without power drive, and propulsion means for the aircraft adapted to be driven when the rotor is being driven, said propulsion means being located only on one side of the longitudinal plane of symmetry of the aircraft, to wit—toward that side on which the rotor blades advance into the flight wind during translational flight, whereby to counteract rotor driving torque, the sustaining rotor being offset from the longitudinal plane of symmetry of the craft in a direction opposite to the offset of the propulsion means to counteract the drag of the propulsion means when the rotor and airscrew are not being driven.

17. An aircraft including a sustaining rotor arranged generally centrally above the body of the craft, a pair of propulsive airscrews positioned toward opposite sides of the longitudinal plane of symmetry of the craft, engine means for driving the rotor and airscrews, disconnectible power transmission means between the engine and rotor, disconnectible power transmission means between the engine and the airscrew disposed at that side of the longitudinal plane of symmetry on which the rotor blades retreat during translational flight, and control mechanism for said disconnectible power transmissions providing for connection of the rotor drive when the airscrew drive is disconnected and for connection of the airscrew drive when the rotor drive is disconnected.

18. An aircraft in accordance with claim 17, wherein the rotor blades are mounted for pitch variation, and further incorporating pitch control means associated with said control mechanism providing for increase of mean rotor blade pitch when the airscrew drive is disconnected and the rotor drive is connected and for decrease of mean rotor blade pitch when the rotor drive is disconnected and the airscrew drive is connected.

19. An aircraft having a sustaining rotor with blades mounted with freedom for pitch variation between a predetermined mean autorotational pitch setting and a higher mean pitch setting, disconnectible drive means for the rotor providing alternatively for driven operation of the rotor and for autorotative actuation of the rotor, blade pitch control means operative upon disconnection of the rotor drive to decrease the mean pitch angle to said predetermined autorotational setting and operative upon connection of the rotor drive to increase the mean pitch angle to said higher setting, and propulsion means for the aircraft adapted to be driven when the rotor is being driven, the propulsion means being offset to that side of the longitudinal plane of symmetry of the aircraft on which the rotor blades advance into the flight wind during translational flight.

20. An aircraft in accordance with claim 19, and further incorporating additional propulsion means offset from the longitudinal plane of symmetry of the aircraft at that side thereof on which the rotor blades retreat during translational flight, and disconnectible drive mechanism for said second propulsion means, with control means therefor operative to connect the airscrew drive when the rotor drive is disconnected and to disconnect the airscrew drive when the rotor drive is connected.

21. An aircraft including a variable pitch sustaining rotor generally centralized over the body of the craft, engine means for driving the rotor, propulsion means for the aircraft adapted to be driven when the rotor is being driven, said propulsion means being laterally offset from the longitudinal plane of symmetry of the aircraft toward that side on which the rotor blades advance into the flight wind during translational flight, whereby to counteract rotor driving torque, and mechanism for maintaining substantial uniformity of rotor R. P. M. including a pitch control governor operative to increase the rotor blade pitch upon increase of rotor R. P. M. and to decrease the rotor blade pitch upon decrease of rotor R. P. M.

22. An aircraft including a sustaining rotor generally centralized over the body of the craft, engine means for driving the rotor, variable pitch propulsion means for the aircraft adapted to be driven when the rotor is being driven, said propulsion means being laterally offset from the longitudinal plane of symmetry of the aircraft toward that side on which the rotor blades advance into the flight wind during translational flight, whereby to counteract rotor driving torque, and mechanism for controlling the aircraft in yaw including a control surface on the aircraft and a pitch control for the propulsion means and a manually operable control organ coupled with said surface and the pitch control and providing for increase or decrease of the mean pitch of the propulsion means to vary the propulsive thrust, whereby to vary the rotor driving torque-counteractive effect of the propulsion means.

23. An aircraft having a sustaining rotor with blades mounted with freedom for pitch variation between a predetermined mean autorotational pitch setting and a higher mean pitch setting, disconnectible drive means for the rotor providing alternatively for driven operation of the rotor and for autorotative actuation of the rotor, blade pitch control means operative upon disconnection of the rotor drive to decrease the mean pitch angle to said predetermined autorotational setting and operative upon connection of the rotor drive to increase the mean pitch angle to said higher setting, variable pitch propulsion means for the aircraft adapted to be driven when the rotor is being driven, said propulsion means being offset to that side of the longitudinal plane of symmetry of the aircraft on which the rotor blades advance into the flight wind during translational flight, additional variable pitch propulsion means offset from the longitudinal plane of symmetry of the aircraft at that side thereof on which the rotor blades retreat during translational flight, disconnectible drive mechanism for said second propulsion means, with control means therefor operative to connect the drive therefor when the rotor drive is disconnected and to disconnect the drive for the propulsion means when the rotor drive is connected, and mechanism for controlling the aircraft in yaw including means for controlling the pitch of the propulsion means and a manually operable control for the pitch control means providing for relative variation in the thrust of the propulsion means at opposite sides of the longitudinal plane of symmetry of the aircraft.

24. An aircraft including a sustaining rotor generally centralized over the body of the craft, engine means for driving the rotor, variable pitch propulsion means for the aircraft adapted to be driven when the rotor is being driven, said propulsion means being laterally offset from the longitudinal plane of symmetry of the aircraft toward that side on which the rotor blades advance into the flight wind during translational flight, whereby to counteract rotor driving torque, and mechanism for controlling the aircraft in yaw including a control surface on the aircraft in the slipstream of the propulsion means and a manually operable control organ coupled with said surface, whereby to provide a variable rotor driving torque-counteractive moment, the mechanism for controlling the aircraft in yaw further including means interrelating operation of said control surface with variation of the mean pitch of the propulsion means.

25. An aircraft including a sustaining rotor generally centralized over the body of the craft, engine means for driving the rotor, propulsion means for the aircraft adapted to be driven when the rotor is being driven, said propulsion means having its mean thrust line laterally offset from the longitudinal plane of symmetry of the aircraft toward that side on which the rotor blades advance into the flight wind during translational flight, whereby the propulsive thrust sets up a force opposing the effect of the reactive torque imposed on the body during drive of the rotor, a control surface positioned to control the aircraft in yaw, means for varying the effective torque counteractive force of the propulsion means, and means for controlling said last means and said control surface in common.

26. In a rotary wing aircraft the combination of a single power plant, a single sustaining rotor with variable mean pitch and a propulsive airscrew arranged with its axis offset from the axis of the sustaining rotor, the sustaining rotor and airscrew both being driven by the said power plant with constant gear ratio between rotor and propulsive airscrew, the pitch angle of the rotor blades being regulated by a "constant-speed" governor mechanism and optionally by an overriding manual control as well.

27. In a rotary wing aircraft the combination of a single power plant, a single sustaining rotor and a controllable pitch propulsive airscrew arranged with its axis offset from the axis of the sustaining rotor, the sustaining rotor and airscrew both being driven by the said power plant, with means for controllably tilting the path swept by the tips of the rotor blades with respect to the body of the aircraft.

28. In a rotary wing aircraft the combination of a single power plant, a single sustaining rotor, a control surface, a controllable pitch propulsive airscrew arranged with its axis offset from the axis of the sustaining rotor, the sustaining rotor and airscrew both being driven by the said power plant, and a rudder bar coupled with said control surface, the pitch of the propulsive airscrew also being controlled by said rudder bar, for the purpose of control of the aircraft in yaw.

29. In a rotary wing aircraft the combination of a single power plant, a sustaining rotor and a propulsive airscrew arranged with its axis offset from the axis of the sustaining rotor, the sustaining rotor and airscrew both being driven by the said power plant, the mean pitch angle of the rotor blades being controlled by a "constant-speed" governor and the pitch of the airscrew being controlled by means interconnected with the rotor blade pitch controlling means in such a manner as to maintain at least approximate balance between the moment of the airscrew thrust about the rotor axis and the torque reaction of the rotor.

30. In a rotary wing aircraft the combination of a single power plant, a sustaining rotor and a propulsive airscrew arranged with its axis offset from the axis of the sustaining rotor, the sustaining rotor and airscrew both being driven by the said power plant, the mean pitch angle of the rotor blades being controlled by a "constant-speed" governor and the pitch of the airscrew being controlled by means interconnected with the rotor blade pitch controlling means in such a manner as to maintain at least approximate balance between the moment of the airscrew thrust about the rotor axis and the torque reaction of the rotor, and manually operable means for regulating the relation between rotor pitch and airscrew pitch to vary the power distribution ratio.

31. In a rotary wing aircraft, a sustaining rotor, a propulsive airscrew offset laterally from the axis of the rotor, a rudder, a power unit, a power transmission system connecting said power unit to drive said rotor and said airscrew, automatic means for regulating simultaneously the rotor blade pitch and the airscrew pitch, manual control means overriding said automatic means for regulating the rotor blade pitch and the airscrew pitch, manual steering and yaw control means operative to adjust the rudder and the airscrew pitch (independently of the rotor blade pitch), and manual flying control means operative to tilt the path swept by the tips of the rotor blades.

32. In a rotary wing aircraft a sustaining rotor, two propulsive airscrews symmetrically spaced laterally of the aircraft, a rudder, a power unit, a power transmission system connecting said power unit to drive said airscrews, automatic means for regulating the rotor blade pitch, manual control means overriding said automatic means for regulating the rotor blade pitch, manual steering and yaw control means operative to control a rudder and to adjust differentially the pitch of the two airscrews, and manual flying control means operative to tilt the path swept by the tips of the rotor blades.

33. In a rotary wing aircraft, a sustaining rotor, two propulsive airscrews symmetrically spaced laterally of the aircraft, a power unit, a power transmission system including clutches and connecting the power unit permanently to drive one airscrew, through a clutch to drive the other airscrew, and through another clutch to drive the rotor, control means for said clutches whereby when either is engaged the other is disengaged, automatic means governed by said clutch control means to operate when the rotor clutch is engaged to regulate simultaneously the pitch of the rotor blades and the pitch of the permanently driven airscrew and when the rotor clutch is disengaged to regulate the rotor blade pitch only, manual control means overriding said automatic means, manual steering and yaw control means governed by the clutch control means to be operative when the rotor clutch is engaged to adjust the pitch of the permanently driven airscrew independently of the rotor blade pitch and when the rotor clutch is disengaged to adjust differentially the pitch of the two airscrews, and, manual flying control means operative to tilt the path swept by the tips of the rotor blades.

34. In a rotary wing aircraft having the features set forth in claim 33, two rudders situated in the slip streams of the two airscrews, respectively, and control means for said rudders operable together with the manual steering and yaw control means.

JAMES ALLAN JAMIESON BENNETT.